(12) United States Patent
Mohan (10) Patent No.: US 6,980,151 B1
(45) Date of Patent: Dec. 27, 2005

(54) SYSTEM AND METHOD FOR ONBOARD DETECTION OF BALLISTIC THREATS TO AIRCRAFT

(75) Inventor: Paul L. Mohan, Novi, MI (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 0 days.

(21) Appl. No.: 10/868,675

(22) Filed: Jun. 14, 2004

(51) Int. Cl.[7] .................. G01S 13/88; G01S 13/02; G01S 7/35
(52) U.S. Cl. .................. 342/13; 342/5; 342/12; 342/14; 342/27; 342/28; 342/61; 342/118; 342/128; 342/192; 342/195; 342/196
(58) Field of Search .................. 342/1–20, 59, 342/82–103, 175, 192–197, 73–81, 104, 342/109, 113, 118, 126, 128–133, 27, 28, 342/61–67, 450–465

(56) References Cited

U.S. PATENT DOCUMENTS

| | | | |
|---|---|---|---|
| 2,939,134 A * | 5/1960 | Van Atta | 342/59 |
| 3,727,222 A * | 4/1973 | Hollis | 342/80 |
| 3,728,724 A * | 4/1973 | Alpers | 342/83 |
| 4,176,351 A | 11/1979 | DeVita et al. | |
| 4,200,871 A * | 4/1980 | Roeder et al. | 342/78 |
| 4,201,986 A * | 5/1980 | Ducrocq | 342/100 |
| 4,700,191 A | 10/1987 | Manor | |
| 4,763,128 A | 8/1988 | Caswell | |
| 5,047,778 A * | 9/1991 | Cofield et al. | 342/97 |
| 5,122,801 A | 6/1992 | Hughes | |
| 5,280,294 A | 1/1994 | Hammerquist | |
| 5,287,110 A * | 2/1994 | Tran | 342/13 |
| 5,361,069 A | 11/1994 | Klimek, Jr. et al. | |
| 5,381,156 A * | 1/1995 | Bock et al. | 342/126 |
| 5,406,286 A | 4/1995 | Tran et al. | |
| 5,424,744 A | 6/1995 | Westphal | |
| 5,428,221 A | 6/1995 | Bushman | |
| 5,549,477 A | 8/1996 | Tran et al. | |
| 5,550,546 A | 8/1996 | Noneman et al. | |
| 5,560,567 A | 10/1996 | Hallmark | |
| 5,574,458 A | 11/1996 | Tran | |
| 5,600,434 A | 2/1997 | Warm et al. | |
| 5,662,291 A | 9/1997 | Sepp et al. | |
| 5,757,310 A | 5/1998 | Millward | |
| 5,828,334 A | 10/1998 | Deegan | |

(Continued)

OTHER PUBLICATIONS

Bhattacharya, T.K. et al., "*Time Frequency Based Detection Scheme for Missile Approach Warning System (MAWS),*" RADAR 97, pp. 539-543, Oct. 14-16, 1997.

(Continued)

Primary Examiner—Bernarr E. Gregory
(74) Attorney, Agent, or Firm—Michael J. Bell; Howrey LLP (57) ABSTRACT

A bi-static continuous wave radar system and related methods for detecting incoming threats from ballistic projectiles includes a remote source of RF illumination, and a local receiver installed in one or more target aircraft. A first receiving channel acquires direct path illumination from the source and provides a reference signal, and a second receiving channel acquires a scatter signal reflected by a projectile. A processor coupled to each receiver corrects scatter signal Doppler offset induced by relative source motion, isolates narrowband Doppler signals to derive signatures characteristic of the projectile, and by executing appropriate algorithms, compares the derived signatures to modeled signatures stored in memory. If the comparison yields a substantial similarity, the processor outputs a warning signal sufficient to initiate defensive countermeasures.

67 Claims, 8 Drawing Sheets

U.S. PATENT DOCUMENTS

| | | |
|---|---|---|
| 5,894,343 A | 4/1999 | French |
| 6,054,701 A | 4/2000 | Regensburger |
| 6,137,436 A | 10/2000 | Koch |
| 6,231,002 B1 | 5/2001 | Hibma et al. |
| 6,369,885 B1 | 4/2002 | Brown et al. |
| 6,426,684 B1 | 7/2002 | Watkins |
| 6,492,937 B1 | 12/2002 | Sparrow et al. |
| 6,529,157 B1 * | 3/2003 | Mensa et al. ............... 342/195 |
| 6,674,520 B2 | 1/2004 | Hicks et al. |
| 6,683,555 B2 | 1/2004 | Carlson et al. |
| 6,720,907 B1 * | 4/2004 | Miron ........................ 342/195 |
| 2003/0014200 A1 | 1/2003 | Bar-Avi et al. |
| 2004/0004707 A1 | 1/2004 | DeFlumere |

OTHER PUBLICATIONS

Lacomme, P., "*Airborne Metric Frequency Surveillance Radar,*" RADAR 97, pp. 70-74 Oct. 14-16, 1997.

Skolnik, M.I., "*Introduction to Radar Systems, Second Edition,*" pp. 1-19, 33-45, 68-98, 101, McGraw-Hill 1980.

Toomay, J.C., "*Radar Principles of the Non-Specialist,*" Lifetime Learning Publications 1982.

\* cited by examiner

SYSTEM AND METHOD FOR ONBOARD DETECTION OF BALLISTIC THREATS TO AIRCRAFT

BACKGROUND OF THE INVENTION

1. Field of the Invention

This invention relates generally to airborne threat monitoring systems, and more specifically to systems employing bi-static continuous wave radar to enable an aircraft to sense incoming ballistic threats and initiate responsive countermeasures.

2. Related Art

The evolving face of global terrorism has crystallized the threat that inexpensive and readily available shoulder-fired missiles can be directed against civilian aircraft. The FBI estimates that since 1989, more than 50,000 shoulder-fired missiles, or MANPADS (man-portable air-defense systems), have been sold to third-world countries, and that from 1978–1998, 29 civilian planes have been shot down by shoulder-fired missiles. More recently, the war in Iraq has provided a proving ground for this tactic, where terrorist militia have struck at least twelve aircraft with shoulder-fired missiles in a three-month time period from October 2003 to January 2004. These targets have included assault helicopters such as the AH-64 Apache, UH-60 Black Hawk, and OH-58 Kiowa, and also passenger-capable aircraft such as the CH-47 Chinook helicopter, C-5 and C-17 transport planes, and the DHL cargo plane.

Shoulder-fired weapons such as the Soviet designed rocket-propelled grenade (RPG) and SA series surface-to-air missiles have been used effectively in many of these assaults. The Soviet RPG-7, a relatively inexpensive device, is the most widely distributed shoulder-fired missile system in the world. It is a lightweight, requires little training, and can propel an 85-mm warhead to a range of about 300 m. The Soviet-made SA-7 surface-to-air missile can reach altitudes of up to 12,000 feet and can be launched more than two miles away from a target. The SA-7 incorporates a heat-detection targeting system, and carries a 1.6 inch warhead. The SA-7, or variants thereof, are manufactured in Pakistan, North Korea, and Cuba, from which sales of the weapon have been traced to at least 17 terrorist organizations and 56 countries. The Soviet-made SA-16, a more advanced surface-to-air missile, incorporates an infrared guidance system. It has a 72 mm warhead, a range of about 5000 m, and a maximum altitude of about 3500 m. At least 34 countries are believed to be in possession of the SA-16. The RPG and SA series weapons relatively light weight, about five to six feet long, and can be smuggled inside a large duffle bag. In the hands of terrorists, shoulder-fired munitions such as these represent a serious security threat to civilian aircraft.

While a number of sophisticated missile warning and countermeasure systems are available for use on military aircraft to detect and defend against such threats, a need exists for an effective solution in civilian applications. A number of approaches that address this problem have been explored, but none have been successfully developed for widespread use. U.S. Pat. No. 5,600,434 to Warm et al., "Apparatus for Defending Against an Attacking Missile," describes a system that applies a pulsed laser source, directed by optical tracking, onto an incoming missile. The laser energy is emitted toward the attacking missile in order to disturb the missile's optronic detector function in hopes of causing the missile to lose track. U.S. Pat. No. 5,361,069 to Klimak et al., "Airborne Radar Warning Receiver," describes an approach to rapidly indicate when an aircraft has entered a ground based track-while-scan radar sector and to indicate the angular position of the aircraft within this sector. U.S. Pat. No. 6,369,885 to Brown et al., "Closed-loop Infrared Countermeasure System Using High Frame Rate Infrared Receiver," describes a system which provides simultaneous tracking and identification/classification functions with an infrared receiver having a focal plane array. The invention provides variable imaging rates to detect, jam and divert an incoming infrared missile. U.S. Pat. No. 6,137,436 to Koch, entitled "Alarm Sensor, in Particular for a Target Tracking Apparatus," describes a system which radiates a pseudo-noise-modulated spread spectrum into displaced spatial sectors, and applies cross correlation of the received reflected energy to provide a spherical monitoring effect to warn against an attacking guided missile. U.S. Pat. No. 5,560,567 to Hallmark, "Passive Missile Tracking and Guidance System," describes a scanning or staring infrared detection system in which the target and missile are optically sensed and the measured displacement is utilized in conjunction with calculated nominal trajectory data to generate guidance control signals. U.S. Pat. No. 5,424,744 to Westphal for a "Sensor Arrangement for Sensing a Threat" describes a passive warning system that exploits blocking effects as a threat intervenes in the line of sight between one of a plurality of signal sources (specifically sources onboard a satellite) and a receiver. The approach can distinguish threat direction based on the signal source that is obscured.

One major obstacle to development of any of the aforementioned missile warning and countermeasure systems for non-military applications is the cost of upgrading. Owners and operators of civilian and small commercial aircraft enterprises are not able to afford the costs of such sophisticated protection systems. Compatibility problems must also be overcome, due to wide variations in the design of civilian aircraft. In other cases, spatial considerations may discourage installation of a warning and countermeasure system on an aircraft where the availability of space for retrofit systems is already at a premium. A practical solution to counter ballistic threats to civilian aircraft has yet to be fully developed.

SUMMARY

The present invention addresses such a solution by providing civilian and military aircraft with a low-cost means to rapidly determine an imminent threat from an incoming ballistic projectile (e.g. a shoulder launched missile). The invention applies a wide area radio frequency (RF) illumination that is shared among a large number of defended aircraft. Each aircraft requires only a passive receiver and a signal processor that exploits narrow-band Doppler scattering effects to implement an onboard missile threat detection system.

The invention comprises illuminating a broad volume of airspace with a controlled source of RF energy. In one embodiment, the RF energy is transmitted in the form of a continuous wave (CW) radar signal. The source may be onboard a geostationary satellite, a lighter-than-air vehicle, an aircraft, a low or medium Earth orbiting satellite (LEO or MEO), or may be located on a stationary platform on ground or on a mountaintop. The system operates bistatically, with each receiver sited on a target aircraft remote from the transmitter. A first receiver channel on each receiver acquires a direct path illumination from the source and provides a reference signal. As an incoming ballistic projectile enters the illuminated region, RF energy from the source reflected (or scattered) by the projectile is detected by a second receiver channel on each receiver. The on-board signal processor processes the reference and reflected signals to isolate desired narrowband, projectile-induced Doppler signals from noise, from ambient scatter of other objects, and from background terrestrial RF sources. Characteristic signatures in the differential Doppler time-frequency domain are exploited to determine the presence and trajectory of an incoming projectile. These signatures enable the processor to distinguish projectiles from Doppler profiles of benign airborne scatterers, and from terrestrial RF sources such as radio and TV carriers. When the processor determines that a true threat exists, appropriate countermeasures, such as releasing chaff or thermal decoys, can be deployed to address the threat.

One object of the present invention is to minimize the per-aircraft cost of implementing a countermeasure system for ballistic threats to aircraft. This is achieved through application of a bi-static collection geometry that separates the transmitting and receiving antennas. Thus, each aircraft requires only a passive, receive-only radar detection system, and each receive-only system responds to the same active RF transmitter that illuminates a broad field of airspace shared among all aircraft in the fleet.

Another object of the invention is to exploit narrow-band Doppler induced frequency shifts of projectile-scattered RF energy to determine the presence of a ballistic threat. Another object of the invention is the application of unique algorithms for efficient determination of ballistic threats.

Another object of the invention is to employ, in the passive on-board receiver, an independent receiving channel for receiving direct path illumination from the source. This provides a reference signal to establish Doppler offsets due to relative motion of the RF illuminator. Once determined, the offsets can be accounted for by downstream processing.

Another object of the present invention is to apply moving-window, time integration of a dynamic Doppler history to establish a slowly varying spectral background. This allows for an accurate calculation of a moving average of background noise, which, when subsequently removed, enables better detection of transient missile signatures. Another object of the invention is to apply source modulation schemes to improve detection of desired scatter signals against the RF background of terrestrial sources.

The present invention provides many advantages over existing projectile detection systems. One advantage is the ability to centrally control illumination parameters such as beamwidth, power level, frequency, modulation waveform, polarization, and source location. Another advantage is an ability to enhance performance characteristics such as operating range, probability of detection, and accuracy, over a wide range of operational situations. Another advantage is a lower per-aircraft system cost. Another advantage is an ability to detect projectiles with low radar cross section (RCS), such as non-metallic projectiles, by exploiting scatter mechanisms induced, for example, by shockwave air pressure gradients. A further advantage is the ability to detect airborne threats through cloud cover.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale, emphasis instead being placed upon illustrating the principles of the invention.

FIG. 1a illustrates one embodiment of a system according to the invention for onboard detection of ballistic threats to aircraft.

FIG. 1b shows one embodiment of a two-channel receiver/processor of the system of FIG. 1a.

DETAILED DESCRIPTION

As utilized herein, terms such as "about" and "substantially" and "near" are intended to allow some leeway in mathematical exactness to account for tolerances that are acceptable in the trade. Any deviations upward or downward from the value modified by the terms "about" or "substantially" or "near" in the range of 1% to 20% or less should be considered to be explicitly within the scope of the stated value. Accordingly, two parts are "substantially similar" if a comparison between the two yields at least 80% commonality in a selected characteristic.

As used herein, the term "software" includes source code, assembly language code, binary code, firmware, macro-instructions, micro-instructions, or the like, or any combination of two or more of the foregoing.

The term "memory" refers to any processor-readable medium, including but not limited to RAM, ROM, EPROM, PROM, EEPROM, disk, floppy disk, hard disk, CD-ROM, DVD, or the like, or any combination of two or more of the foregoing, which may store data accessible by a processor such as a series of software instructions executable by a processor.

The terms "processor" refers to any device capable of executing a series of instructions and includes, without limitation, a CPU, a general- or special-purpose microprocessor, a finite state machine, a controller, computer, digital signal processor (DSP), or the like.

The term "logic" refers to implementations in hardware, software, or combinations of hardware and software.

The term "projectile" as used herein is understood to describe, in a broad sense, all forms of missile ordnance, including flack, large-caliber (>30 caliber) arms fire, shoulder-fired missiles, rocket propelled grenades, mortar rounds, surface-to-air missiles, cannon fire, artillery fire, anti-aircraft missiles, explosive warheads, and the like.

Figures 1A, 1B:
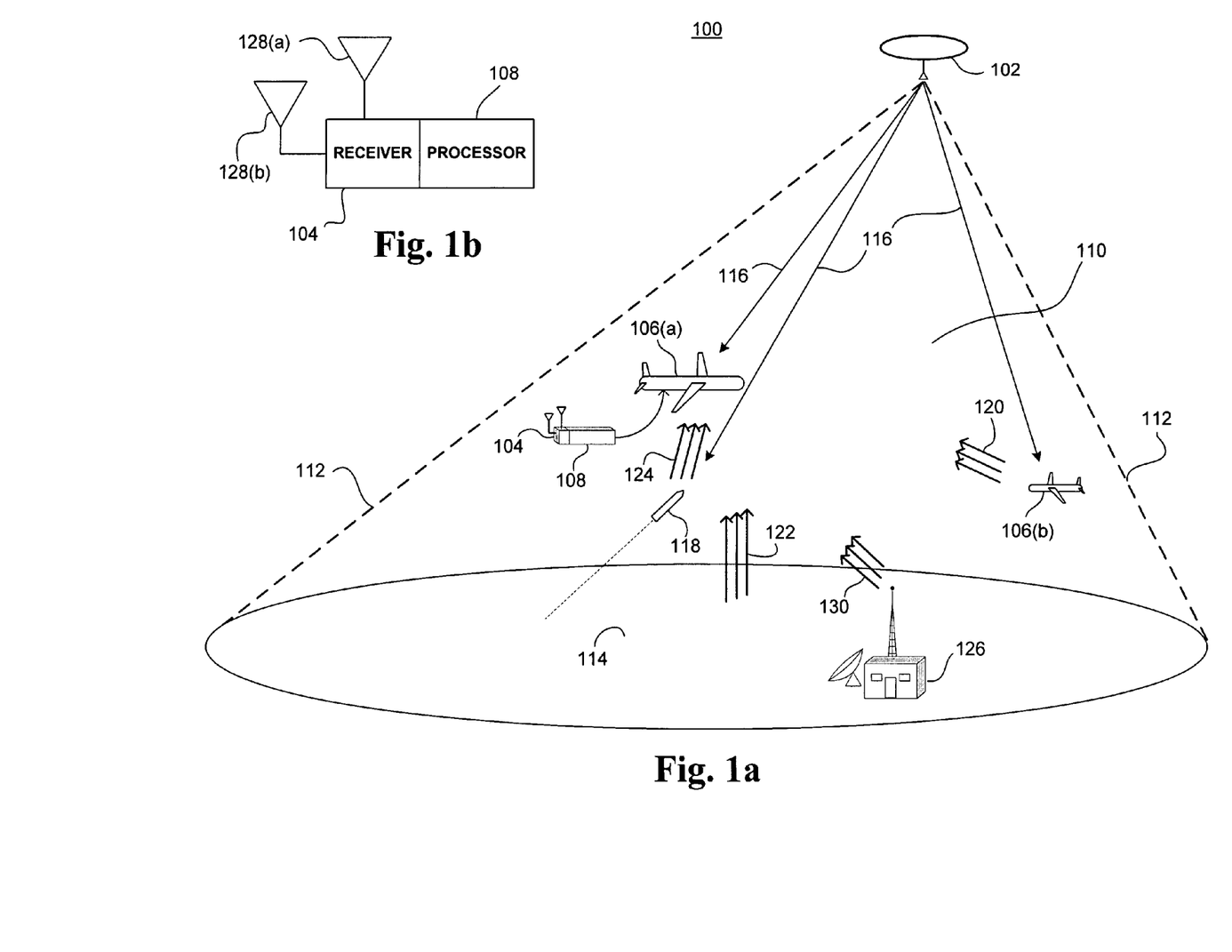

FIG. 1a illustrates, in a conceptual sense, one embodiment of a system 100 according to the invention for onboard detection of ballistic threats to target aircraft. At a basic level, system 100 comprises a transmission source, transmitter 102, for transmitting RF energy, and a receiver 104 for detecting RF energy transmitted from transmitter 102. Transmitter 102 and receiver 104 operate according to radar principles that are well known in the art as disclosed, for example, in Merill I. Skolnik, "Introduction to Radar Systems," 2d Ed. 1980, and J. C. Toomay, "Radar Principles," 1982, both of which are fully incorporated by reference herein as though set forth in full. In one embodiment, one or more receivers 104 are mounted locally in a plurality of aircraft comprising a fleet, wherein each aircraft 106(a), 106(b) . . . 106(n) (where n signifies an indefinite number) in the fleet houses at least one receiver 104, and wherein each receiver 104 is configured with, or coupled to, a processor 108. This configuration advantageously minimizes the per aircraft cost of system 100 by enabling multiple aircraft to share a common transmitter 102.

In operation, transmitter 102 transmits RF energy that illuminates a volume of airspace 110. Airspace 110 is shown in FIG. 1a as the space bordered at its sides by phantom lines 112 and at its bottom by a portion of the earth's surface 114. Airspace 110 is the greatest volume in which transmitted RF signal 116 may reflect from a desired target with sufficient signal strength to be detected by a local receiver 104. Thus, airspace 110 will vary according to many factors, such as the strength and frequency of RF signal 116, the design of the transmitting antenna of transmitter 102, meteorological conditions, etc. In one embodiment, transmitter 102 illuminates airspace 110 with CW radar transmitted at a controllable amplitude and frequency, in any manner known in the art or described, for example, in Skolnik, pp. 68–98. Because transmitter 102 is common to all target aircraft in the fleet, it advantageously provides centralized control over transmission variables such as beamwidth, power level, frequency, modulation waveform, polarization, and source location. Transmitter 102 is advantageously positioned to illuminate as broad an airspace 110 as possible, and in this regard may be located onboard a geostationary satellite, a lighter-than-air vehicle, an aircraft, an LEO or MEO satellite, or transmitter 102 may be located on a stationary platform on ground or on a mountaintop. RF energy 116 transmitted from transmitter 102 thus illuminates, and reflects from, various objects located within airspace 110.

According to fundamental radar theory, a portion of the transmitted signal 116 may be intercepted by any such object, and reradiated (or reflected, or scattered), from the object. Objects capable of reflecting a detectable RF signal include airborne and terrestrial objects, such as aircraft 106(b), earth surface 114, and ballistic projectile 118. RF energy reflected or scattered from these objects creates signals 120, 122, and 124, which illuminate airspace 110 as airborne or terrestrial scatter. Of particular interest in the present invention is a "reflected signal" comprising a portion of RF energy transmitted by transmitter 102 that reflects or scatters from a threatening ballistic projectile. The power density, $S_1$, of an RF signal at the location of a reflecting object 106(b), 114, or 118 is determined by the well-known radar range equation:

$$S_1 = \frac{PG_T}{4\pi R_1^2} \text{ W/m}^2 \quad (1)$$

where P represents transmitted power, $G_T$ is the gain of the transmission antenna, and $R_1$ is the direct path distance from transmitter 102 to the reflecting object 106(b), 114, or 118. The power density, $S_2$, of a reflected RF signal at any location within airspace 110, e.g. the location of receiver 104, is given by:

$$S_2 = \frac{S_1 \sigma}{4\pi R_2^2} \text{ W/m}^2 \quad (2)$$

where σ is the radar cross section of the reflecting object 106(b), 114, or 118, and $R_2$ is the distance from the reflecting object 106(b), 114, or 118 to receiver 104.

In one embodiment of the present invention, receiver 104 is configured with two receiving channels, as shown in FIG. 1b. The first of these channels 128(a) is configured to acquire a reference signal 116 from transmitter 102, and the second of these channels 128(b) is configured to acquire one or more reflected signals 124 from airborne threats such as ballistic projectile 118. In one aspect of the invention, reference signal 116 is acquired by direct path illumination from transmitter 102. In another aspect of the invention, processor 108 comprises filtration circuitry to discriminate between signals indicative of a potential threat, and signals reflected from a benign object. Benign sources of RF may comprise, for example, airborne scatter 120 from another aircraft 106(b), terrestrial scatter 122 from surface 114, or interference 130 from a terrestrial transmission system 126. Thus, processor 108 may be configured with appropriate discriminating circuitry to extract reference signal 116 from first receiving channel 128(a), and to extract threat signal 124 from second receiving channel 128(b). In another aspect of the invention, the discriminating circuitry exploits the Doppler shift phenomenon. A signal, such as signal 124 received by receiver 104 after reflecting from an object in motion relative to receiver 104, will experience a Doppler shift in its frequency. The Doppler shift provides a useful discriminator to distinguish reflections of high-velocity projectiles (such as shoulder-launched missiles) from other non-threatening low-level scatter signals. That is, a signal 124 reflected from a ballistic projectile 118 will be confined to a narrow frequency band relative to the transmission frequency of reference signal 116. Processor 108 may then isolate a Doppler signal from signal 124 by filtering out wideband interference effects. Once the Doppler signal is isolated, processor 108 may then pass only those signals within a desired Doppler bandwidth, and analyze the passed signals to determine whether a true threat exists.

In one implementation, through the use of an analysis and algorithm approach, which is described below in further detail, processor 108 determines whether the Doppler signal matches the signature of a known (or modeled) ballistic threat, and if so, calculates the trajectory of projectile 118. If processor 108 determines that projectile 118 is on a collision course with aircraft 106(a), a warning signal is generated, and, responsive to the warning, target 106(a) can take one or more appropriate countermeasures known in the art to neutralize the threat, such as the release of chaff or thermal decoys. In another implementation, processor 108 may simply detect the presence of a ballistic threat and, without determining trajectory, generate a warning signal.

Analysis and Algorithm Approach

The basic concept of the analysis and algorithm approach is to exploit phenomenology derivable from a high-velocity projectile as it attempts to close on its target. One advantage that flows from this approach is that implementation of the exploitation algorithm allows for rapid execution using standard low-cost computing hardware that can be easily integrated into existing aircraft. In one embodiment of the present invention, the phenomenology exploited comprises one or more characteristic signatures of the projectile. In another embodiment, the characteristic signature comprises Doppler signals. A particular feature of the algorithm that analyzes Doppler signals is that it continually averages the background spectra in order to remove undesirable effects of terrestrial interference sources. Another feature of the algorithm is an ability to account for motion of the illuminating source relative to the target aircraft and projectile.

Source Motion: In a general case, an illumination transmitter 102 may be moving relative to a target aircraft 106($a$) and a threat projectile 118. This is the case, for example, where transmitter 102 is located on a LEO or MEO satellite platform. To account for this motion and its subsequent effect on the observed scatter Doppler spectrum, a direct path receive channel is incorporated in the receiver 108 according to the invention. Measurement of the direct path Doppler at target aircraft 106($a$) allows arbitrary motion of transmitter 102 to be monitored, and its effect on reflected signal 124 to be factored into an appropriate algorithm in processor 108. This effectively allows the baseline of the observed Doppler scatter spectrum to be normalized.

Figure 2:
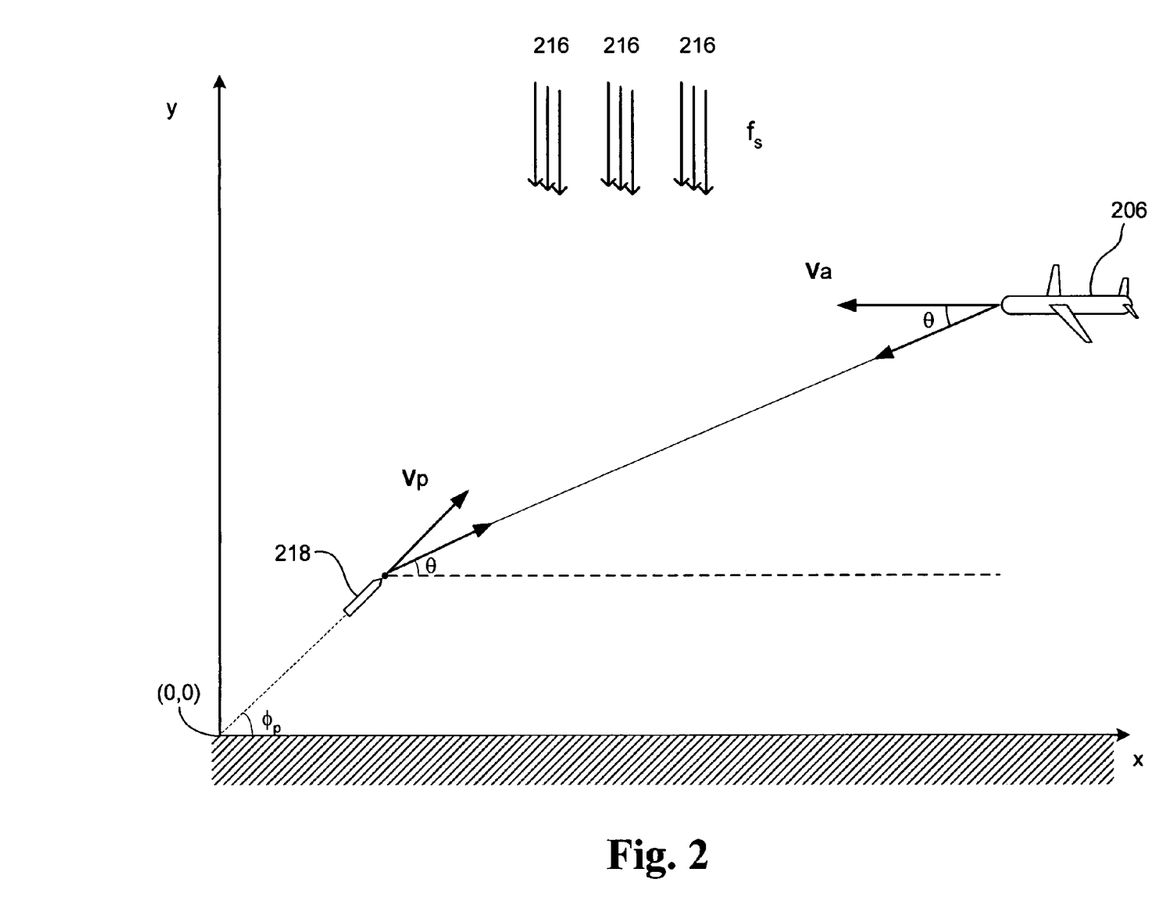
FIG. 2 illustrates a simplified geometry for Doppler modeling in an algorithm embodying a method according to the invention.

System modeling: To characterize the expected Doppler scatter spectra observed onboard an aircraft for a representative scenario, consider a simplified geometry as depicted in FIG. 2. In this example, the following conditions are assumed: (1) the target aircraft 206, RF reference signal 216, and projectile 218 lie in the same x-y coordinate plane, as shown; (2) RF illumination source (not shown) lies overhead at far range; (3) target aircraft 206 maintains level flight at constant speed $V_a$, and (4) projectile 218 maintains a fixed velocity vector ($V_p$, $\phi_p$) over the course of its flight. Typical parameters values are as follows: $V_p$=700 meters/sec (Mach 2.2); $\phi_p$=45°; $V_a$=−200 meters/sec; and source frequency $f_s$=200 MHz. One skilled in the art will recognize that a method according to the invention for detecting ballistic threats, and the development of corresponding algorithms, may be derived from other representative scenarios wherein the assumed conditions and parametric values are other than those stated above.

Figure 3A:
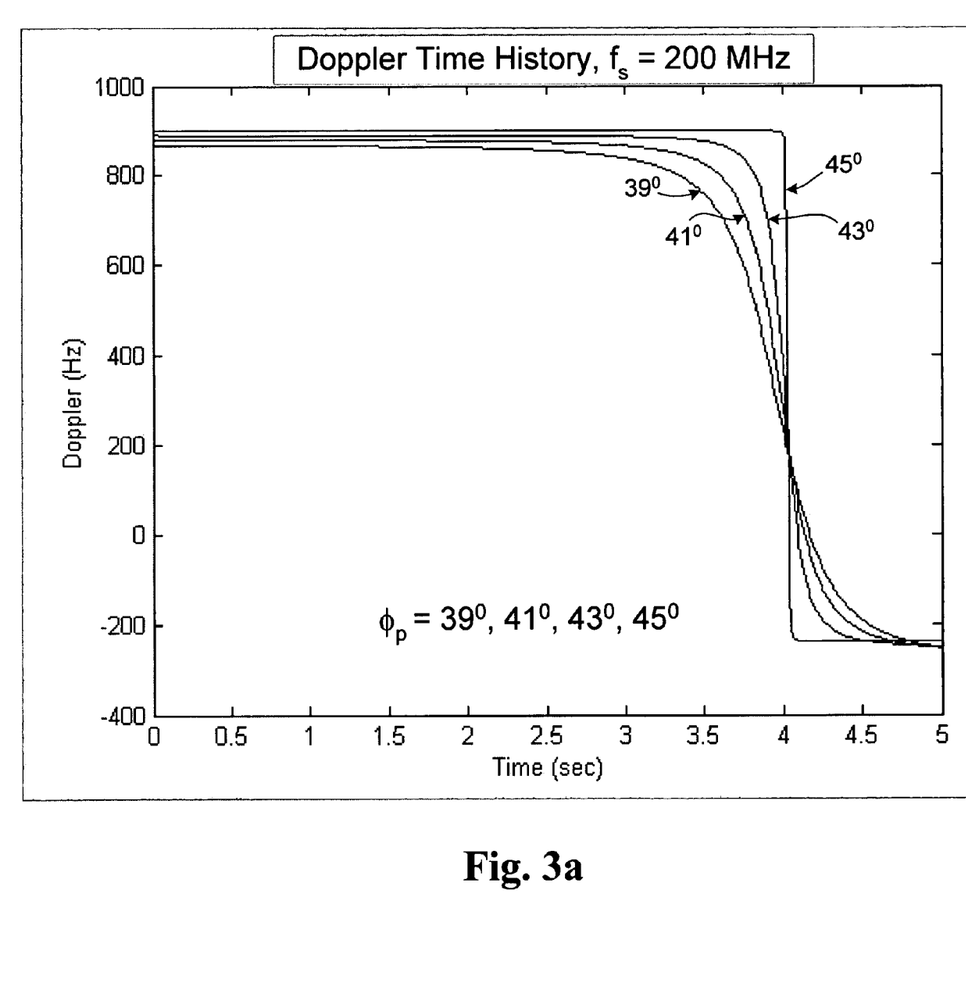
FIG. 3a is a graphical representation of a simulated Doppler time-frequency history of reflected signals for projectile elevation angles approaching 45 degrees.
Figure 3B:
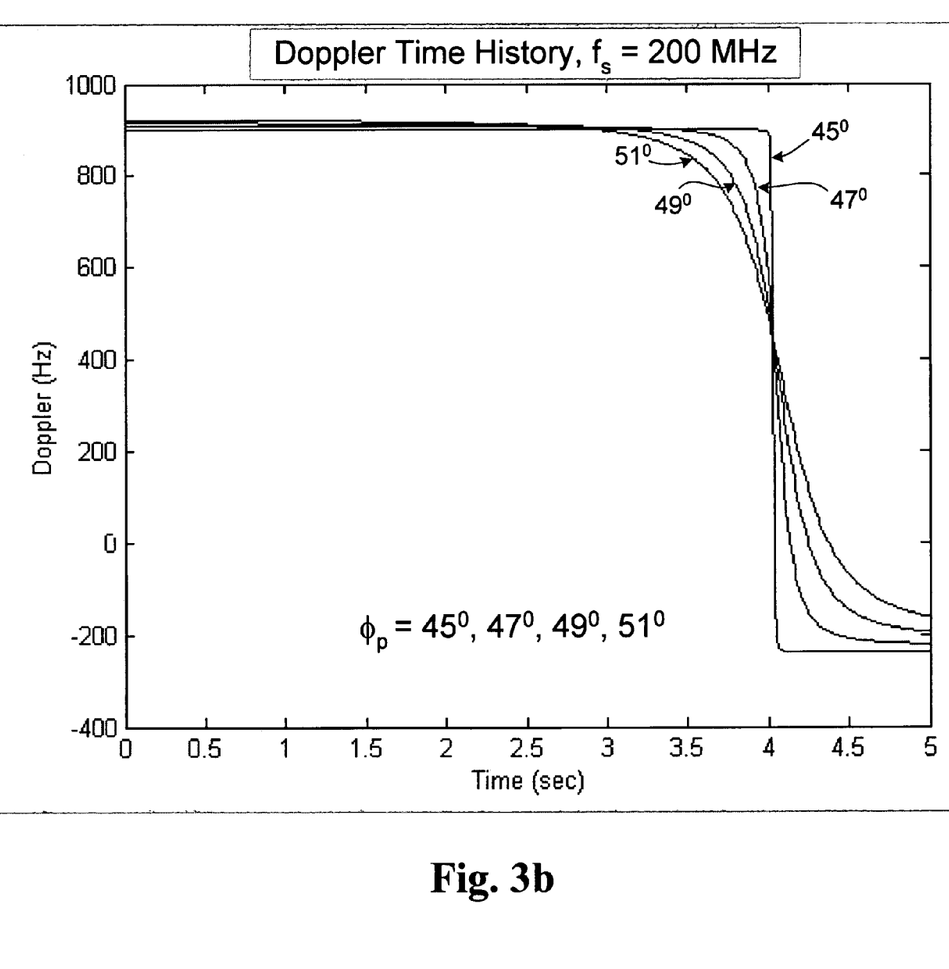
FIG. 3b is a graphical representation of a simulated Doppler time-frequency history of reflected signals for projectile elevation angles greater than 45 degrees.

FIGS. 3$a$ and 3$b$ provide a simulated family of Doppler frequency-time histories (as detected at target aircraft 206) based on the representative scenario depicted in FIG. 2. The Doppler histories are shown in two-degree increments as the projectile elevation angle $\phi_p$ is varied from about 39 to about 45 degrees (FIG. 3$a$), and from about 45 to about 51 degrees (FIG. 3$b$). For each plot, the same starting position of target aircraft 206 is assumed, namely, $x_0$= 2.8 km and $y_0$=2 km, with respect to the FIG. 2 origin (0,0) which is defined as the starting position of projectile 218. For this particular geometry and set of assumptions, projectile 218 only impacts the target when projectile elevation angle $\phi_p$ is 45 degrees. The impact occurs at t= 4 seconds.

From these simulations, one can observe that as projectile 218 approaches target 206, the detected Doppler offset remains relatively constant and limited to a maximum, shown in FIGS. 3$a$ and 3$b$ as the horizontal asymptote between 800 Hz and 1000 Hz. The Doppler offset then drops rapidly as the closing range approaches its minimum, which in this scenario occurs at t=4 seconds. As projectile 218 reaches this range, the rate of change of Doppler frequency reaches a maximum. Non-impacting projectiles continuing beyond this range are limited to a maximum negative Doppler offset, shown as the horizontal asymptote between −200 Hz and −400 Hz.

Considering the behavior of the Doppler profiles introduced above, as well as the expected interference and clutter environment, the following processing approach extracts the desired Doppler scatter that is indicative of an incoming projectile. With reference to the block diagram of FIG. 4, a system 400 according to the invention now described. Receiver 404, which in this embodiment comprises a two-channel narrowband receiver, is configured with a first antenna 428($a$) coupled to a direct path receive channel, and a second antenna 428($b$) coupled to a scatter path receive channel. From antenna 428($a$), the direct path signal 416 is acquired from transmitter 402 and fed to receiver 404. Similarly, from antenna 428($b$), the scatter path signal 420 is acquired from one or more reflective objects, such as a projectile, and fed to receiver 404. Using techniques well known in the art, for each of the two channels, receiver 404 amplifies, filters and down-converts the raw RF into baseband signals of a specified bandwidth that encompasses the Doppler bandwidth. The receiver center frequency is determined by the selected operating frequency of the transmitter. A number of single sideband (SSB-USB mode) digital synthesis receiver designs are available to support this function. However, a prerequisite for any such receiver 404 is a frequency stability better than ±3 ppm, a requirement that can be readily met by currently available hardware. From receiver 404, the direct and scatter channel outputs 460 and 462 (which may be in complex I,Q format) are fed to a signal processor 408, which comprises hardware and software components required for processing signals 416 and 420, and for executing appropriate algorithms that analyze these signals to determine whether a detected projectile poses a true threat to a local target aircraft.

Figure 4:
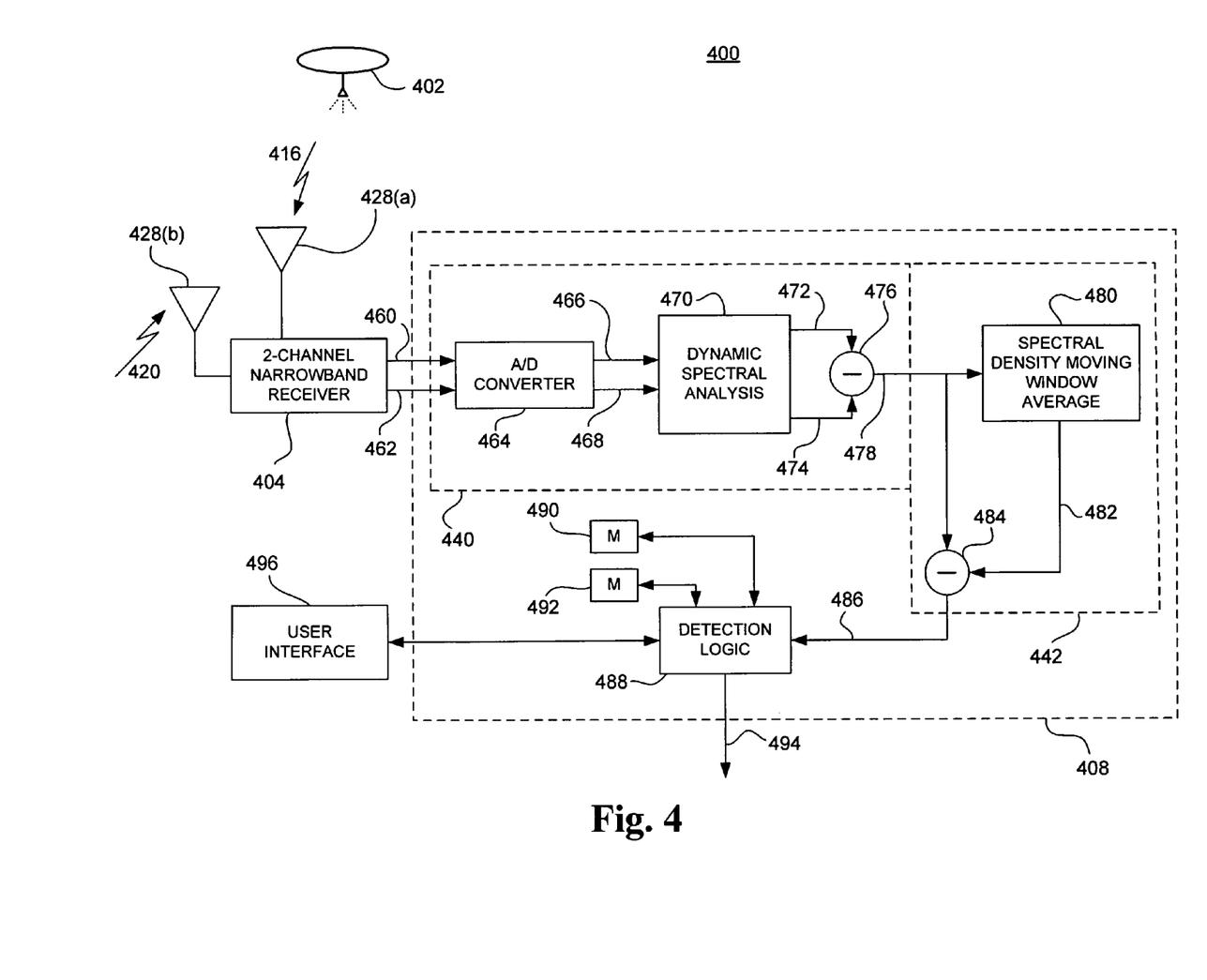
FIG. 4 is a block diagram of one embodiment of a system according to the invention for processing reference and reflected RF signals.

In one embodiment, signal processor 408 comprises an analyzer 440, a discriminator 442, one or more memory modules 490, 492, and detection logic 488. Direct and scatter channel outputs 460 and 462 are received by analyzer 440 as inputs to a dual-channel analog-to-digital (A/D) converter 464, the dual channels corresponding to the direct and scatter channels. A/D converter 464 is configured to maintain a sampling rate that is consistent with the Nyquist criteria for the baseband Doppler bandwidth. From A/D converter 464, digitized data streams 466 and 468, corresponding, respectively, to the direct and scatter channels, feed a dynamic spectral analysis module 470 that develops continually updated spectral density data over time for each channel. Module 470 outputs spectral density signals 472 and 474, for the respective direct and scatter channels, to comparator 476. There, the Doppler offset determined to exist on the direct channel is subtracted in the frequency domain from the spectral content on the scatter channel to effect removal of relative source motion (i.e. motion of transmitter 402) from the scatter path. Following this step, analyzer 440 outputs the resulting time-frequency data signal 478 to discriminator 442. Signal 478 is fed directly to module 480, which by periodically sampling signal 478, maintains a moving-window average of the background spectrum 482 across a frequency range and time interval of interest. This provides an assessment of the slowly varying spectral background that tends to smooth out any transient spikes.

In comparator 484, the average background spectrum 482 is routinely removed from the original non-averaged data signal 478. Comparator 484 thus extracts a signal 486 comprising characteristic signatures derived from scatter signal 420, thereby discriminating signals of interest from background noise. These characteristic signatures may comprise time-transient components of the Doppler spectral history indicative of a threat projectile. Other examples of characteristic signatures of interest include time-frequency profiles, and other data from which a projectile flight profile may be derived. Those spectral components in signal 486 that pass through discriminator 442 are then fed to a detection module 488, which determines whether the spectral characteristics fall within the range of a real threat. Detection module 488 performs this step by comparing signal 486 to data stored in one or more memory modules either integral to, or otherwise accessible by, detection module 488. Detection module 488 may thus comprise a logic-control device such as a processor (performing, for example, matched filtering), and the memory modules may comprise any processor-readable medium known in the art. Data stored in the memory modules may comprise a set of values representative of known characteristic signatures (hereinafter "modeled signatures") indicative of a ballistic threat, for example, a set of spectral amplitude and frequency thresholds 490, a template of source modulation spectra 492, or any combination of the foregoing. These modeled signatures may be derived from empirical data and/or from various phenomenology described hereafter.

If the comparison analysis performed by detection module 488 yields a result within a range of match criteria, then a warning signal 494 will be set to indicate that a ballistic threat has been detected and defensive action is warranted. A match criteria may be met, for example, if the result of a comparison indicates that a substantial similarity exists between (1) one or more characteristic signatures derived from a signal 486, and (2) one or more modeled signatures stored in a memory module 490 or 492. Warning signal 494 comprises any means known in the art for triggering or initiating a response from another system. For example, warning signal 494 may comprise a voltage signal, e.g. a logical one at the input to a transistor or amplifier, or it may comprise a voltage or current signal that energizes a relay, switch, motor, wireless transmission, or other electrical or mechanical device or interlock suitable for the purpose of actuating an appropriate defensive countermeasure to address the ballistic threat. In an alternative embodiment, system 400 comprises a means for deploying one or more defensive countermeasures responsive to the warning signal.

If however, the comparison yields a result outside the range of a match criteria, no warning signal is set. This is the case, for example, when scatter signal 420 comprises only extraneous reflections of the overhead RF illumination that fall within the field of view of the receiver 404. These may be caused by scatter signals 122 from the Earth or 120 from other aircraft or man made objects. Detected scatter from stationary and slow moving objects (relative to a typical missile) will have a lower Doppler spectrum that will not bear a substantial similarity to one or more modeled signatures of a ballistic threat. Optionally, detection module 488 (or another module within signal processor 408) is configured with filtration circuitry to specifically filter such lower Doppler spectrum signals out of the detection process.

Interference Sources: Airborne receivers 404 could be subject to numerous interference sources from active ground-based transmitters including radio and TV stations, cellular phones, FM/AM radio, etc. Judicious selection of the illuminator frequency can help reduce the effects of these types of transmission interference. However, a feature of the algorithm is to maintain a moving-time window over which the background spectral density is averaged (i.e. a moving-window average). In this way environmental sources are characterized and their presence can be removed by downstream processing. A transient Doppler event induced by a missile approach can then be more easily extracted from amid a crowded spectral band filled with terrestrial sources. For example, in one embodiment of the invention, an algorithm executed by detection module 494 may search for a differential change in spectral power within a designated Doppler bandwidth, which change is characteristic of a ballistic threat. This feature provides a useful method for mitigating the effects of constant or recurring transmission interference.

Figure 5:
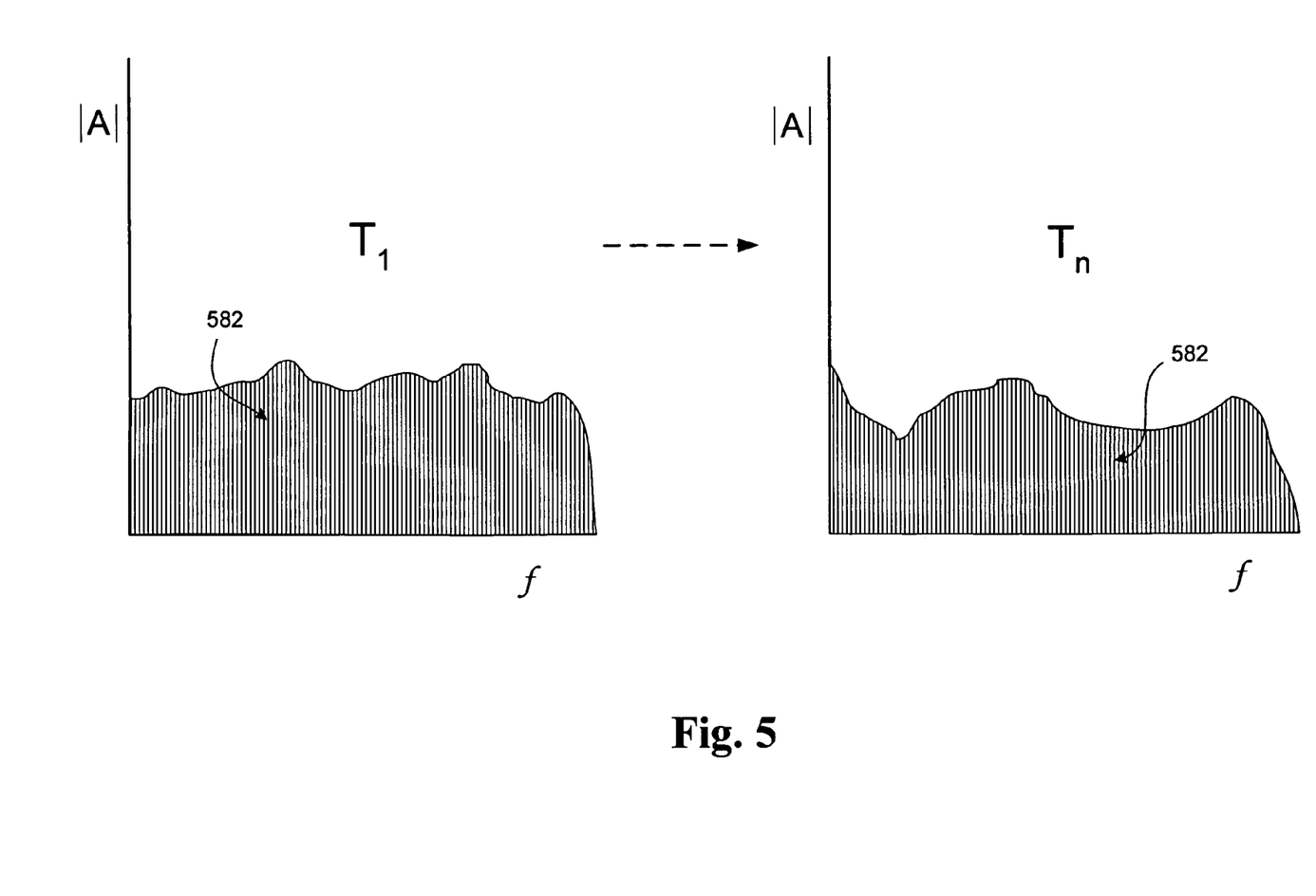
FIG. 5 illustrates a moving-window average of spectral background density changing shape from time $T_1$ to time $T_n$.

FIG. 5 illustrates two moving-window averages, the first calculated at time $T_1$ and the second calculated at a later time $T_n$. In each plot, the magnitude |A| of spectral background at any frequency f represents a moving-window average of spectral background densities 582 measured over any desired time interval $\Delta t$, at any appropriate sampling rate. For example, the spectral density shown at time $T_1$ represents the average spectral density measured between time $(T_1-\Delta t)$ and $T_1$, and the spectral density shown at time $T_n$ represents the average spectral density measured between time $(T_n-\Delta t)$ and $T_n$. By maintaining this moving-window average, module 480 may extract from signal 478 a substantially smooth background spectrum 482, despite the presence of isolated peaks, for later use in isolating spectral components of interest from signal 478.

Phenomenology

The characteristic signatures described above that are indicative of a ballistic threat are narrowband Doppler signals derived from scatter signal 420. However, one skilled in the art will readily recognize that characteristic signatures of a ballistic projectile exploitable by the present invention are in no way limited to narrowband Doppler signals. A scatter signal 420 may contain various phenomenology exploitable by the present invention for purposes of detecting ballistic threats. Examples of other phenomenology extractable from scatter signals also include, in a non-limiting sense, projectile flight profile, Doppler bandwidth, and radar cross section (RCS).

Projectile Flight Profile: This characteristic signature comprises data representing the predicted path of a ballistic projectile in three-dimensional space. For initial analysis and algorithm design, one can assume, as in the above discussion of FIG. 2, a straight-line velocity vector with constant magnitude and elevation angle. Later refinement can incorporate the effects of many other variables, either detectable by receiver 104 or provided to processor 108 from another onboard source, that affect the probability of a collision, such as wind direction and speed, changes in the velocity and flight path of the target aircraft, and in-flight maneuvering of an attacking missile provided by a thermal tracking & guidance system. Multi-dimensional vectors are then derived from these variables for both projectile 118 and target aircraft 106($a$). An algorithm, executed by processor 108, then calculates, based on the vectors, the probability of a collision. If the probability meets or exceeds a predetermined threshold, processor 108 outputs a warning signal, and in response, aircraft 106($a$) may initiate appropriate countermeasures.

Doppler Bandwidth: This characteristic signature comprises data representing a Doppler bandwidth of signals reflected by an incoming projectile. Typical geometries generally associated with attack scenarios yield a well constrained magnitude range of Doppler shifts imparted by projectile scattering. By exploiting only narrowband Doppler signatures to detect the incoming projectile, the system is able to reduce wideband interference effects. In one embodiment, the disclosed approach allows for the application of a modulated signal source as the illuminator. Doppler shifted modulation will appear on the desired scatterer returns and provide a useful discriminator to improve detectability and distinguish low-level scatter signals from potentially strong terrestrial RF sources that fall within the Doppler passband.

Radar cross section: RCS is an important characteristic in detecting scattered energy from a projectile. The RCS of an object of radius r in the Rayleigh region ($2\pi r/\lambda \ll 1$) is sensitive to polarization and aspect angle. In the Rayleigh case, the RCS, $\sigma$, for targets can be approximated as $$\sigma = 80\pi^3 \left(\frac{V^2}{\lambda^4}\right) m^2 \qquad (3)$$

where V is the spherical volume, and $\lambda$ is the wavelength ($\lambda = c/f_s$) of the illuminating radiation. Toomay, "Radar Principles," p. 65, 1982. Typical RCS values for a spherically approximated warhead with r=3.5 cm are $3 \times 10^{-5}$ m$^2$ for $f_s$=250 MHz and $3 \times 10^{-1}$ m$^2$ for $f_s$=2.5 GHz. RCS values within this range are said to lie within a warhead range. It should be noted that the warhead range given above is an approximation only, and should not be thought of in any limiting sense. Because the design and composition of projectile warheads varies, the RCS will vary accordingly. For example, the upper bound on the warhead range may exceed $3 \times 10^{-1}$ m$^2$, particularly for ordnance having r greater than 3.5 cm. For non-metallic materials, the RCS may drop to very low values, thus the lower bound on warhead range may be even less than $3 \times 10^{-5}$ m$^2$, depending on warhead composition and dimensions. In the case where warhead RCS is less than about $3 \times 10^{-5}$ m$^2$, an alternative embodiment may exploit the supersonic shock front that exists out ahead of the moving projectile. The very high pressure gradient in this area will form boundary zones of varying dielectric constant. The characteristic scattering of RF illumination reflecting from these boundary zones provides an alternate mechanism for detecting the incoming projectile when its surface scatter is otherwise undetectably low.

System Design Criteria

Other system design criteria relevant to a system according to the invention include:

Antenna Configuration: In one embodiment, for a system comprising an illumination transmitter 102 located onboard a satellite or otherwise overhead at a very high altitude relative to target aircraft 106(a), there is a preferred configuration of receiver antennas. Ideally, direct path antenna 128(a) is mounted on or near the top of aircraft 106(a) to facilitate direct path illumination from transmitter 102, and scatter path antenna 128(b) is mounted on or near the underside of aircraft 106(a), which is the side most likely exposed to projectile scatter. Both antennas could exhibit relatively low-gain to provide a large beamwidth (i.e. field of view) in one direction, the one direction being substantially upward for antenna 128(a) and substantially downward for antenna 128(b). In other embodiments, substantial cost reductions could be realized by employing a single-antenna receive configuration. For example, when illumination transmitter 102 comprises a stationary transmitter, a direct path antenna 128(a) may be unnecessary and scatter path antenna 128(b) could comprise an existing VHF communications antenna already installed on aircraft 106(a). In this aspect of the invention, the illumination frequency $f_s$ would need to fall within the bandwidth of the existing antenna.

Regarding the antenna of transmitter 102, a preferred configuration comprises mounting the antenna such that its incident beam illuminates a desired volume of airspace 110. For example, a transmitter 102 located on board a satellite may train its incident beam at the center of the earth, intersecting surface 114 at what is termed the nadir point. Alternatively, the beam may be directed at a fixed location on the earth, such as airspace surrounding an airport or other high-traffic area, while the satellite orbits. In the latter case, an antenna of transmitter 102 may be configured for variable positioning. Another embodiment of the invention contemplates a plurality of transmitters 102, for example, each located on board a different satellite, such that a plurality of airspace volumes 110 may be illuminated. In this embodiment, an aircraft 106(a) may benefit from continuous exposure to at least one RF signal 116 as its flight path takes it from one airspace volume 110 to the next. In one aspect of this embodiment, the plurality of airspace volumes 110 overlap, thereby providing continuous protection for aircraft 106(a). In another aspect, the plurality of airspace volumes 110 overlap only where necessary, that is, where a single transmitter 102 provides insufficient coverage, e.g. over large battlefield areas, large metropolitan areas, or other extended areas at high risk of encountering ballistic threats. In any of these embodiments, a preferred antenna configuration for a transmitter 102 also depends on the desired gain, which is determined according to the desired illumination beamwidth for airspace 110. When selecting antenna gain, skilled artisans will recognize the design tradeoff between power density and illuminating volume. A higher gain offers improved power density, and in turn, improved scatter detectability, but at the expense of a reduction in the illuminating volume 110.

Operating Frequency: One variable under control in developing the disclosed detection system is the operating frequency $f_s$. Selection of this frequency will be influenced by the desire to maximize the RCS for projectiles of interest (see equation 3) while weighing other constraints such as terrestrial interference in that frequency band, or possible FCC restrictions. The RCS of a typical projectile when operating the Rayleigh region is proportional to $\lambda^{-4}$. A typical projectile comprises any of the various projectiles defined above, that are composed of metallic material, and, when in flight, provide an approximately spherical frontal profile of radius r, where $2\pi r/\lambda < 1$. Thus, to increase the RCS, it is necessary to illuminate the projectile with a shorter wavelength. At one extreme, an RCS may be maximized by selecting an operating wavelength $\lambda$ that equals the circumference of the equivalent sphere representing the projectile nose. In other cases, it may be desirable to choose a frequency that corresponds to one of the already available receiver systems onboard the aircraft, such as that used for VHF ground communications.

Polarization: Another variable under control is polarization of the transmitted RF. It is well known in the art that polarization can significantly affect RCS. See, e.g. Toomay at pp. 66–68. For example, when a radar transmits circularly polarized waves, the receiving aperture does not respond to reflections from spherical objects if the transmit and receive polarization is the same. In one embodiment of the present invention, this effect may be mitigated through the use of linear polarization. For certain geometries, linear polarization provides a superior solution to circular polarization, particularly where both the transmit and receive apparatus are operating in the same polarization sense.

Transmission Power: The power, P, of the transmitted RF signal is another controllable variable in a system according to the invention (see equation 1). A higher transmit power may be used to improve signal-to-noise ratio, but there are certain regulatory and practical limitations on maximum transmission power. The desire to boost reflected signals above the level of the background noise spectrum must be balanced by the need to keep power levels within restrictive limits imposed by the FCC for the particular frequency band of interest. Practical limitations on transmission power come into play wherever an illumination transmitter 102 draws power from a limited resource, such as an RF transmitter located on a satellite and that operates on battery power or solar cells.

Source Modulation: Another variable under control is source modulation. Modulation of an RF signal 116 transmitted from a transmitter 102 can be used to facilitate the detectability of threatening projectiles. Knowledge of the spectral signature imparted by the modulation can be exploited to simplify an algorithm used for distinguishing projectile scatter from background noise and terrestrial sources. In one embodiment, a low-frequency (e.g. 100 Hz) amplitude modulation is applied to the RF illumination signal at transmitter 102. Those skilled in the art will realize that by coupling a demodulation or matched filtering component to receiver 104 or processor 108, RF noise or interference issuing from multiple terrestrial sources can easily be filtered out at the receiving stage, while still maintaining Doppler scatter of narrowband bandwidth for downstream processing of reflected signals.

Detection Latency: Detection latency can be defined as the time interval from the time when a ballistic threat enters the surveyed airspace volume 110 to the time at which warning signal 494 is generated. Given the short timelines between launch and potential impact (t=4 seconds for the cited example scenario), this latency time should be maintained as short as reasonably possible. This would allow adequate time for countermeasures (e.g. thermal decoys) to be deployed and to take effect. The current state of technology in commercial, general purpose processor chips (such as the PPC970) is such that implementing a near real-time algorithm response within an onboard processor is realistically attainable. For example, the implementation of continuous frequency-time analyses with processor 108 could be carried out through the use of the fast Fourier transform (FFT). Typical benchmark performance of the PPC970 for a 4096-point complex FFT is roughly 56 microseconds. The use of single or multiple CPUs of this class, each capable of averaging at least $1 \times 10^9$ floating point operations per second (flops/sec), will enable detection latency times of 250 milliseconds or less, a value that is quite suitable for the intended application.

Example operating parameters: In one embodiment of a system according to the invention, a set of operating parameters applying the disclosed approach comprises the following:

(1) Projectile speed: 600 to 800 meters/second;
(2) Illumination frequency/power: $f_s$=200 MHz ($\lambda$=1.5 m) @ 1 kW;
(3) Receiving antenna gain: 3 dBi;
(4) Doppler pass band from carrier: 700 to 1000 Hz ($f_s$=200 MHz);
(5) Maximum detection range from aircraft: 5 km;
(6) Angular field of view (from aircraft vertical centerline): +/−60 degrees; and
(7) Time latency for processor output: 0.2 second.

Figure 6:
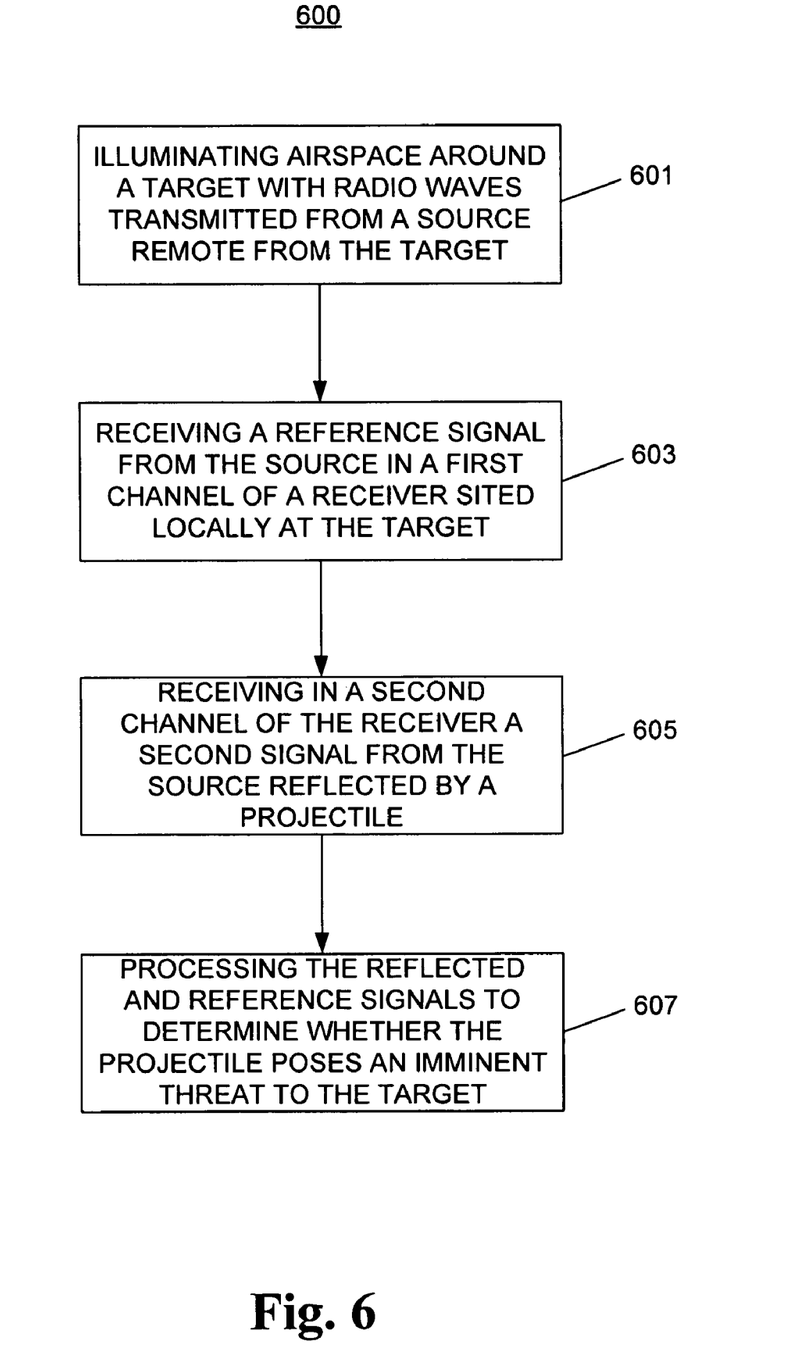
FIG. 6 illustrates one embodiment of a method according to the invention for detecting ballistic threats to aircraft.

Methods According to the Invention:

FIG. 6 illustrates one method 600 according to the present invention for detecting ballistic threats to aircraft. The method begins with step 601, by illuminating an airspace around a target aircraft with RF waves transmitted from a transmission source in a remote location relative to the target. As in previously described embodiments, the transmission may comprise a CW radar signal, and the illuminated airspace may comprise a broad volume of atmosphere bordered at its bottom by the earth's surface, and at its sides according to the limits of transmission signal strength. In another embodiment, the CW radar signal is modulated. The next step in method 600 is step 603, which comprises receiving a reference signal from the transmission source in a first channel of a receiver sited locally at the target. Accordingly, the target aircraft is equipped with some form of receiving means, such as an antenna configured to receive a signal broadcast at the transmission frequency of the source. In one embodiment, the signal received in this step is acquired by direct path illumination from the transmission source. Next, step 605 comprises receiving, in a second channel of the receiver sited locally at the target, a second signal from the transmission source, wherein the second signal comprises a signal reflected by a projectile within the airspace. In the final step 607, the reference signal and the reflected signal are processed by a signal processor to determine whether the projectile poses an imminent threat to the target aircraft. In a preferred embodiment, the signal processor is sited locally on the target aircraft, and is electrically coupled to the two-channel receiver. Processing step 607 may further comprise deriving one or more characteristic signatures from the reflected and/or reference signals. The one or more characteristic signatures may comprise Doppler signals, a Doppler bandwidth, a time-frequency profile, or some other characteristic representative of the projectile such as an RCS or a flight profile. In deriving a flight profile of the projectile, processing step 607 may additionally include a step for accounting for in-flight maneuvering of the projectile, in-flight maneuvering of the target aircraft, or meteorological conditions such as wind direction and velocity.

In another embodiment, method 600 includes an additional step comprising deploying one or more defensive countermeasures, known in the art, responsive to determining an imminent threat. As previously discussed, these countermeasures may be any actions that prevent a ballistic projectile from impacting the target aircraft, such as the release of chaff to collide with the projectile, or the release of thermal decoys to confuse a projectile equipped with a thermal tracking system. In another embodiment, the one or more countermeasures are deployed responsive to the processor deriving one or more characteristic signatures that substantially match any of one or more modeled signatures or characteristics that are stored in a memory accessible by the processor.

Figure 7:
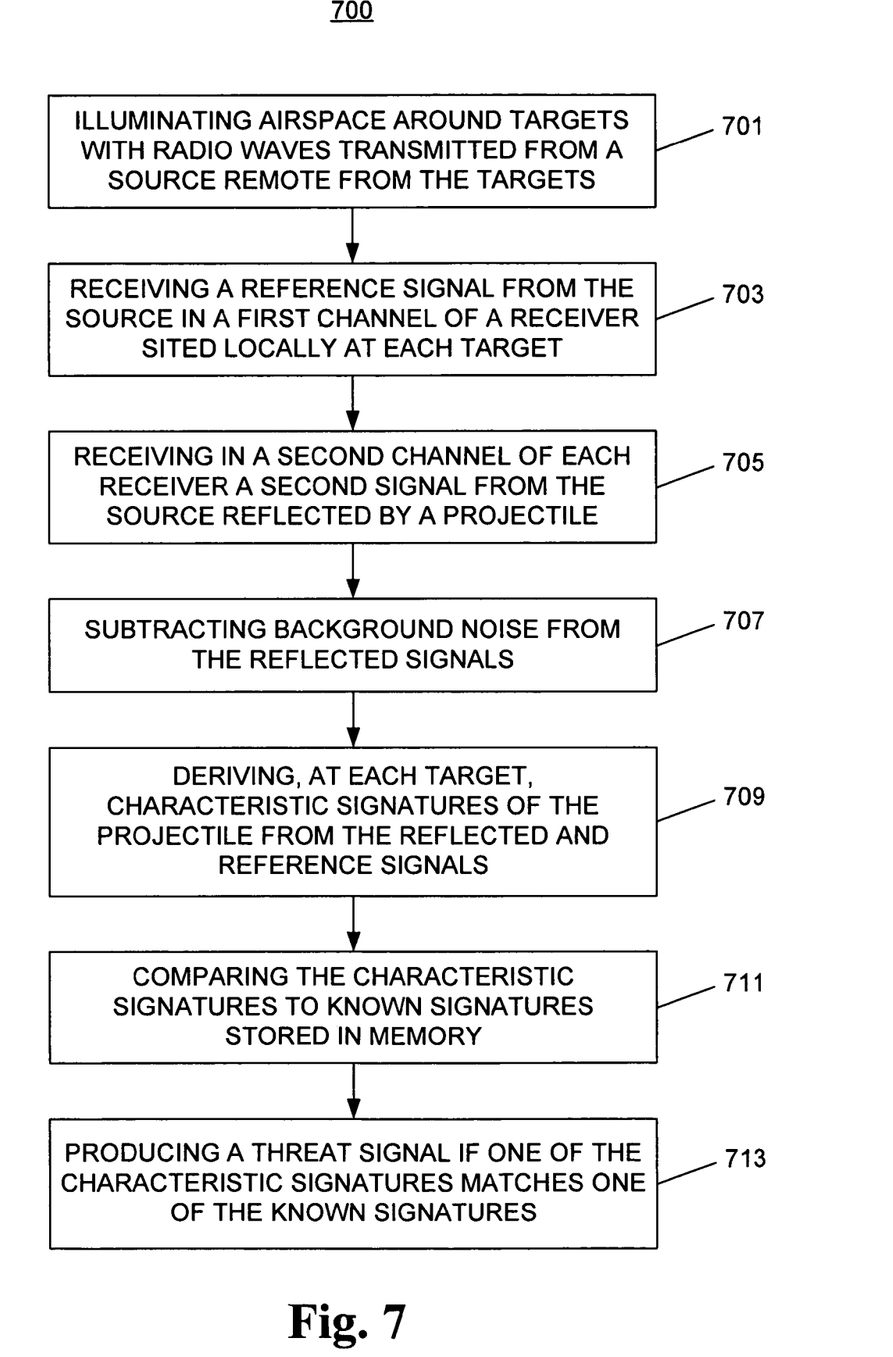
FIG. 7 illustrates another embodiment of a method according to the invention for detecting ballistic threats to aircraft.

Referring now to FIG. 7, a method 700 is disclosed according to the invention for detecting ballistic threats to aircraft consistent with principles of the system inventions previously discussed. Method 700 begins at step 701, in which an RF illumination source in a remote location relative to one or more target aircraft illuminates, with radio waves, a broad volume of airspace surrounding the one or more aircraft. In a preferred embodiment, the RF illumination comprises a transmission of CW radar, and in another embodiment, the CW radar signal may be modulated. Step 701 is followed by step 703, in which a first receiving channel of a receiver mounted locally within each of the one or more target aircraft, receives a reference signal from the RF illumination source. Next, in step 705, the one or more receivers receive, in a second channel, a second signal from the illumination source. The second signal comprises a portion of the transmitted signal that reflects from a ballistic projectile. Inevitably, the receiver will receive some amount of background noise in the form of scatter from objects other than the projectile, and from other sources of RF energy. Thus, the next step 707 comprises, by means of a processor coupled to each of the one or more receivers, subtracting background noise from the reflected signal. In one embodiment, this step may comprise subtracting background noise from signals received in each of the first and second channels. In the following step 709, a deriving means (e.g. a processor) located on each target aircraft derives one or more characteristic signatures of the projectile responsive to receiving the reference and reflected signals. The characteristic signatures may comprise, for example, one or more sets of spectral amplitude and frequency profiles (or thresholds), one or more narrow band Doppler signals, an RCS of the projectile, or a flight profile of the projectile and/or target aircraft. Next, step 711 comprises comparing the one or more derived characteristic signatures to a set of modeled signatures or characteristics that are stored in a processor-readable memory. In an alternate embodiment, step 711 comprises predicting whether the projectile and target will collide based on flight profiles. Finally, in step 713, method 700 outputs a warning signal if, based on the comparison of the previous step, one of the derived characteristic signatures is substantially similar to at least one of the known or modeled signatures. Alternatively, where the derived characteristic signal comprises a flight profile, step 713 outputs a warning signal responsive to predicting an imminent collision.

With reference again to FIG. 4, a skilled artisan will recognize that any of the previously described methods may be tangibly embodied as a series of instructions stored in a memory device coupled to a processor 408 or 488. These instructions are accessible to processor 408/488 through any conventional means such as an address bus and a data bus. A user interface 496 may be any suitable interface for allowing a user to input information to a processor 408/488 and/or allowing processor 408/488 to provide or display information to a user, including but not limited to a personal computer, display, keyboard, mouse, touch-screen, or the like.

In operation, a user may input to processor 408/488 one or more commands through user interface 496. Responsive to the one or more commands, processor 408/488 retrieves instructions stored in memory 804 corresponding to the one or more commands, and executes the instructions, thus performing one or more steps of a method according to the invention. Alternatively, a user may transfer data for storage in a memory module 490 or 492 through user interface 496. Or, though user interface 496, a user may save a program in a memory accessible by, or integral to, processor 408/488, which memory embodies one or more algorithms according to the invention. It is noted, however, that a user interface 496 is not required for operation of the present invention, which, in one embodiment, may function automatically.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A radar system for detecting a presence of a ballistic projectile, comprising:
 a source of radio frequency energy, sited remotely from a target, for illuminating airspace around the target;
 a receiver, sited locally to the target, the receiver having first and second receiving channels, the first receiving channel configured to acquire a reference signal from the source, and the second receiving channel configured to acquire a second signal from the source, the second signal reflected by the projectile; and
 a signal processor including a means for determining whether the projectile poses an imminent threat to the target.

2. The system of claim 1 further comprising a means for generating a warning signal responsive to the signal processor detecting the presence of the ballistic projectile.

3. The system of claim 1 further comprising a means for deploying one or more countermeasures responsive to the signal processor detecting an imminent threat.

4. The system of claim 3 wherein the deploying means comprises releasing chaff or thermal decoys.

5. The system of claim 3 wherein the signal processor derives one or more Doppler signals from the reflected signal and the reference signal.

6. The system of claim 5 wherein the one or more Doppler signals comprise a Doppler bandwidth.

7. The system of claim 5 wherein the one or more Doppler signals comprise a time-frequency profile.

8. The system of claim 5 wherein the signal processor outputs one or more characteristic signatures of the projectile derived from the one or more Doppler signals.

9. The system of claim 8 wherein the deploying means deploys the one or more countermeasures responsive to the processor outputting the one or more characteristic signatures.

10. The system of claim 8 wherein at least one of the characteristic signatures comprises a radar cross section.

11. The system of claim 10 wherein the radar cross section lies within a warhead range.

12. The system of claim 8 wherein at least one of the characteristic signatures comprises a flight profile of the projectile.

13. The system of claim 12 wherein the one or more countermeasures are employed responsive to the processor predicting a collision between the projectile and the target based on the flight profile.

14. The system of claim 12 wherein the flight profile accounts for in-flight maneuvering by the projectile.

15. The system of claim 8 further comprising a memory coupled to the processor, the memory storing data representing one or more modeled signatures of ballistic projectiles.

16. The system of claim 15 wherein the deploying means deploys the one or more countermeasures responsive to the processor determining that at least one of the one or more characteristic signatures is substantially similar to any of the one or more modeled signatures.

17. The system of claim 1 wherein the source comprises a continuous wave transmitter.

18. The system of claim 17 wherein the continuous wave is modulated.

19. The system of claim 1 wherein the reference signal is acquired by direct path illumination from the source.

20. The system of claim 1, wherein the means for determining is a detection module, the detection module being configured to compare data associated with the second signal with a match criteria to determine if the ballistic projectile poses an imminent threat.

21. A radar system for detecting an imminent threat from a ballistic projectile, comprising:
   a source of radio frequency energy, sited remotely from a target, for illuminating airspace around the target;
   a receiver, sited locally to the target, the receiver having first and second receiving channels, the first receiving channel configured to acquire a reference signal from the source, and the second receiving channel configured to acquire a second signal from the source, the second signal reflected by the projectile;
   a signal processor, sited locally to the target, for processing the reflected signal and the reference signal to derive one or more characteristic signatures induced by the projectile, the signal processor further comprising:
      an analyzer for removing, from the reflected signal, Doppler effects caused by motion of the source;
      a discriminator for subtracting background noise from the reflected signal;
      one or more memory modules coupled to the processor for storing one or more modeled signatures; and
      detection logic for comparing the one or more derived characteristic signatures to the one or more modeled signatures;
   whereby if the comparison detects a substantial similarity between at least one of the characteristic signatures and at least one of the modeled signatures, the signal processor outputs a warning signal.

22. The system of claim 21 further comprising a means for deploying one or more countermeasures responsive to the warning signal.

23. The system of claim 22 wherein the deploying means comprises releasing chaff or thermal decoys.

24. The system of claim 22 wherein the source comprises a transmitter.

25. The system of claim 24 wherein the transmitter transmits a continuous wave.

26. The system of claim 25 wherein the continuous wave is modulated.

27. The system of claim 21 wherein the reference signal is acquired by direct path illumination from the source.

28. The system of claim 21 wherein at least one of the derived characteristic signatures comprises one or more sets of spectral amplitude and frequency thresholds.

29. The system of claim 21 wherein at least one of the known signatures comprises one or more sets of spectral amplitude and frequency thresholds.

30. The system of claim 21 wherein at least one of the derived characteristic signatures comprises a narrow band Doppler signal.

31. The system of claim 21 wherein at least one of the derived characteristic signatures comprises a radar cross section.

32. The system of claim 31 wherein the radar cross section lies within a warhead range.

33. The system of claim 21 wherein at least one of the derived characteristic signatures comprises a flight profile of the projectile.

34. The system of claim 33 wherein the detection logic outputs a warning signal responsive to the processor predicting a collision between the projectile and the target based on the flight profile.

35. The system of claim 33 wherein the flight profile accounts for in-flight maneuvering by the projectile.

36. A method for detecting an imminent threat from a ballistic projectile, comprising:
   illuminating airspace around a target with a source of radio frequency energy, the source sited remotely from the target;
   receiving a reference signal from the source in a first channel of a receiver sited locally at the target;
   receiving, in a second channel of the receiver, a second signal from the source, the second signal reflected by the projectile; and
   processing the reflected signal and the reference signal to determine whether the projectile poses an imminent threat to the target.

37. The method of claim 36 further comprising deploying one or more countermeasures responsive to determining an imminent threat.

38. The method of claim 37 wherein the deploying step comprises releasing chaff.

39. The method of claim 37 wherein the deploying step comprises releasing thermal decoys.

40. The method of claim 37 wherein the processing step further comprises deriving one or more Doppler signals from the reflected signal and the reference signal.

41. The method of claim 40 wherein the one or more Doppler signals comprise a Doppler bandwidth.

42. The method of claim 40 wherein the one or more Doppler signals comprise a time-frequency profile.

43. The method of claim 40 wherein the processing step further comprises deriving one or more characteristic signatures of the projectile from the one or more Doppler signals.

44. The method of claim 43 wherein the deploying step further comprises deploying the one or more countermeasures responsive to deriving the one or more characteristic signatures.

45. The method of claim 44 wherein at least one of the characteristic signatures comprises a radar cross section.

46. The method of claim 45 wherein the radar cross section lies within a warhead range.

47. The method of claim 44 wherein at least one of the characteristic signatures comprises a flight profile of the projectile.

48. The method of claim 47 wherein the processing step further comprises predicting whether the projectile and the target will collide based on the flight profile, and wherein the deploying step further comprises deploying one or more countermeasures responsive to a predicted collision.

49. The method of claim 47 wherein the processing step further comprises deriving the flight profile by accounting for in-flight maneuvering by the projectile.

50. The method of claim 43 wherein the deploying step further comprises deploying the one or more countermeasures responsive to deriving at least one of the one or more characteristic signatures that substantially matches any of one or more modeled signatures stored in a memory.

51. The method of claim 36 wherein the illuminating step further comprises transmitting continuous wave radar.

52. The method of claim 51 wherein the continuous wave radar is modulated.

53. The method of claim 36 wherein the first receiving step further comprises acquiring the reference signal by direct path illumination from the source.

54. A method for detecting imminent threats from ballistic projectiles to one or more aircraft targets, comprising:

illuminating airspace around the one or more targets with an RF transmitter sited remotely from the one or more targets;

receiving, in a first channel of a receiver sited locally at each of the one or more targets, a reference signal from the transmitter;

receiving, in a second channel of each receiver, a second signal from the transmitter, the second signal reflected by a projectile;

subtracting background noise from the reflected signal received at each of the one or more targets;

deriving, at each of the one or more targets, one or more characteristic signatures of the projectile, from the reflected signal and the reference signal received at each of the one or more targets;

comparing the one or more derived signatures to one or more modeled signatures stored in a memory; and producing a warning signal if at least one of the derived signatures is substantially similar to at least one of the modeled signatures.

55. The method of claim 54 further comprising deploying one or more countermeasures responsive to producing the warning signal.

56. The method of claim 55 wherein the deploying step further comprises releasing chaff or thermal decoys.

57. The method of claim 54 wherein the illuminating step further comprises transmitting continuous wave radar.

58. The method of claim 57 wherein the continuous wave radar is modulated.

59. The method of claim 54 wherein the first receiving step further comprises acquiring the reference signal by direct path illumination from the transmitter.

60. The method of claim 54 wherein at least one of the derived signatures comprises one or more sets of spectral amplitude and frequency thresholds.

61. The method of claim 54 wherein at least one of the modeled signatures comprises one or more sets of spectral amplitude and frequency thresholds.

62. The method of claim 54 wherein at least one of the derived signatures comprises a narrow band Doppler signal.

63. The method of claim 54 wherein at least one of the derived signatures comprises a radar cross section.

64. The method of claim 63 wherein the radar cross section lies within a warhead range.

65. The method of claim 54 wherein at least one of the derived signatures comprises a flight profile of the projectile.

66. The method of claim 65 wherein the comparing step further comprises predicting whether the projectile and the target will collide based on the flight profile, and wherein the producing step further comprises producing a warning signal responsive to predicting an imminent collision.

67. The method of claim 65 wherein the deriving step further comprises accounting for in-flight maneuvering by the projectile in deriving the one or more characteristic signatures.

* * * * *